(12) United States Patent
Taguchi

(10) Patent No.: US 9,170,459 B2
(45) Date of Patent: Oct. 27, 2015

(54) LIQUID CRYSTAL DISPLAY DEVICE AND MANUFACTURING METHOD THEREOF

(71) Applicant: Takashi Taguchi, Kumamoto (JP)

(72) Inventor: Takashi Taguchi, Kumamoto (JP)

(73) Assignee: Mitsubishi Electric Corporation, Tokyo (JP)

( * ) Notice: Subject to any disclaimer, the term of this patent is extended or adjusted under 35 U.S.C. 154(b) by 169 days.

(21) Appl. No.: 13/858,958

(22) Filed: Apr. 9, 2013

(65) Prior Publication Data

US 2013/0271706 A1  Oct. 17, 2013

(30) Foreign Application Priority Data

Apr. 11, 2012 (JP) ................................ 2012-090342

(51) Int. Cl.
| | | |
|---|---|---|
| *G02F 1/1339* | (2006.01) | |
| *G02F 1/1341* | (2006.01) | |
| *H01J 9/26* | (2006.01) | |
| *H01J 9/32* | (2006.01) | |

(52) U.S. Cl.
CPC ............ *G02F 1/1339* (2013.01); *G02F 1/1341* (2013.01); *G02F 2001/13415* (2013.01)

(58) Field of Classification Search
CPC .......... G02F 1/13314; G02F 1/133512; G02F 1/1341; G02F 1/133; G02F 1/1339; G02F 1/13394; G02F 1/161; G02F 1/13396; G02F 1/13392; G02F 1/133514; G02F 2001/13415; G02F 2001/13396; H01L 21/67178; H01L 21/6715; H01L 21/67173; H01L 51/524–51/526

USPC ............ 349/106, 110, 445, 24, 25, 153, 154, 349/189, 190; 391/611; 355/27; 340/153, 340/154, 189, 190; 313/495–497, 509, 512, 313/582–587; 445/24, 25

See application file for complete search history.

(56) References Cited

U.S. PATENT DOCUMENTS

| | | | | |
|---|---|---|---|---|
| 7,061,568 | B2 * | 6/2006 | Yamaguchi et al. | 349/155 |
| 7,416,977 | B2 * | 8/2008 | Fukuchi et al. | 438/669 |
| 7,732,351 | B2 * | 6/2010 | Oishi et al. | 438/785 |
| 8,133,536 | B2 * | 3/2012 | Mataki et al. | 427/256 |
| 2002/0196393 | A1 * | 12/2002 | Tashiro et al. | 349/106 |
| 2004/0160566 | A1 | 8/2004 | Kawabe et al. | |
| 2011/0292330 | A1 * | 12/2011 | Huang et al. | 349/117 |

FOREIGN PATENT DOCUMENTS

| | | |
|---|---|---|
| JP | 08-190099 A | 7/1996 |
| JP | 2003-315810 A | 11/2003 |

* cited by examiner

*Primary Examiner* — Paisley L Arendt
*Assistant Examiner* — Angela Davison
(74) *Attorney, Agent, or Firm* — Studebaker & Brackett PC

(57) ABSTRACT

A liquid crystal display device includes: a pair of substrates disposed to face each other with a predetermined distance therebetween; a seal pattern, provided between the pair of substrates and has a closed-loop shape to surround and seal a liquid crystal, wherein the liquid crystal is provided in a form of a plurality of droplets on one of the pair of substrates and then is sandwiched between the pair of substrates, so that the plurality of droplets are respectively spread and sealed in a region surrounded by the seal pattern; and a dummy pattern, which is formed on the one substrate in the region surrounded by the seal pattern and has a height less than half of the predetermined distance, the dummy pattern being arranged adjacent to and in parallel to the seal pattern and in a range to which one droplet is spread out.

9 Claims, 8 Drawing Sheets

LIQUID CRYSTAL DISPLAY DEVICE AND MANUFACTURING METHOD THEREOF

CROSS-REFERENCE TO RELATED APPLICATION

This application claims priority from Japanese Patent Application No. 2012-090342 filed on Apr. 11, 2012, the entire subject matter of which is incorporated herein by reference.

TECHNICAL FIELD

This disclosure relates to a liquid crystal display device manufactured by using One Drop Filling method and a method of manufacturing the liquid crystal display device.

BACKGROUND

In a manufacturing process of a liquid crystal display panel, a vacuum filling method and ODF (One Drop Filling) method are generally used as a liquid crystal filling process to fill a liquid crystal into the liquid crystal display panel. In the one drop filling method, a liquid crystal cell is formed in such a way that a substrate on which a seal pattern is formed by applying a sealing agent and on which the liquid crystal is dropped and an opposite substrate are vacuum bonded and then the sealing agent is cured. The sealing agent to form the seal pattern is in an uncured state during the vacuum bonding. Accordingly, when the liquid crystal is excessively spread out to come into contact with the seal pattern, it may cause incoming of the liquid crystal into seal pattern formation regions and contamination of the liquid crystal due to elution of sealing agent component into the liquid crystal. On the other hand, when the spread of the liquid crystal is insufficient, the liquid crystal does not spread out to, especially, a region close to the seal pattern in the display panel and thus bubble regions may be caused. As a result, the cell or seal pattern itself is too squashed in the region close to the seal pattern, and thus the display defects that a peripheral gap (a distance between substrates) becomes non-uniform. Specifically, in a case of a liquid crystal display panel, in which conductive particles are included in the sealing agent, to have a function to enable conduction between the substrates, the seal pattern formation regions are held on the substrate by the conductive particles which are elastically deformable to keep a stable conduction. Accordingly, when the above-described bubble regions is caused and thus a differential pressure greater than an expected pressure by the atmospheric pressure when being open to air is applied, the seal pattern and the conductive particles are more squashed than a predetermined gap. Thereafter, since the sealing agent is cured as it is in the state of squashed gap, the above-described peripheral gap becomes non-uniform and thus occurrence of the defects is to be significant. Further, according to the recent diversification of the liquid crystal display panel, there has also been developed a liquid crystal display panel, in which a width of the frame region is different at four sides, or a variant-shape liquid crystal display panel, which has an outer shape other than a rectangular shape, for example, a circular shape, an elliptical shape or a polygonal shape or the like. In these liquid crystal display panels, the width of the frame region is different in the vicinity of the display region. In particular, the gap unevenness is likely to occur in a relatively wide frame region.

As a method to deal with the above-described situations, JP-A-2003-315810 discloses a method which suppresses the excessive spread of the liquid crystal and suppresses the occurrence of the display defects by forming a frame-shaped liquid crystal flow control wall between the display region and the seal pattern. Also, JP-P-H08-190099 discloses a method, in which the time until the liquid crystal reaches the seal pattern formation regions is extended to suppress the liquid crystal from being in contact with the uncured sealing agent by forming convex parts made from the same material as a color filter and having a frame-shaped pattern or an island-like (dotted) pattern between the display region and the seal pattern.

SUMMARY

However, in order to suppress the uncured sealing agent and the liquid crystal from being brought into contact with each other, JP-A-2003-315810 has focused on slowing the spread of the liquid crystal or controlling the spread of the liquid crystal to spread the liquid crystal into a rectangular shape from a dropping position. Thus, the height of the liquid crystal flow control wall is set to be substantially same as the interval between the pair of substrates or set to be at least more than half of the interval. In addition, since the control wall is formed into an intricate shape like a labyrinth, the spread route of the liquid crystal becomes complex, and therefore the spread rate becomes slow. By doing so, it is thought that an effect to suppress the liquid crystal from being brought into contact with the uncured sealing agent is effectively achieved. Conversely, the spread rate becomes too slow, and therefore the spread of the above-described liquid crystal becomes insufficient. Accordingly, there is a possibility that bubble regions occur in the vicinity of the seal pattern, and thus the occurrence of display defects is promoted. In order to control these display defects, it is necessary to accurately set a dropping position and dropping amount of the liquid crystal, a positional relationship of seal pattern formation regions and a spreading rate or direction of the liquid crystal. In this regard, the dropping position of the liquid crystal and the positional relationship of seal pattern formation regions or the like have not been specifically described in the JP-A-2003-315810. In addition, JP-A-2003-315810 does not disclose an effective method to solve the display defects. Further, there is a possibility that a process of manufacturing the liquid crystal flow control wall is added, and thus productivity becomes poor.

Meanwhile, in JP-P-H08-190099, the spread of the liquid crystal is roughly controlled by the convex parts formed between the display region and the seal pattern, and thus it is possible to delay the contact of the liquid crystal with the sealing agent. However, the liquid crystal is just dropped in a central portion of a region surrounded by the seal pattern, and it is difficult to control the spreading method or rate of the liquid crystal into the region surrounded by the seal pattern in an accurate and proper manner. As a result, it is difficult to deal with the display defects due to the occurrence of the bubble regions.

In view of the above, this disclosure provides at least a liquid crystal display device with high productivity and reliability regardless of the width of the frame region and a method of manufacturing the liquid crystal display device.

A liquid crystal display device of this disclosure includes: a pair of substrates disposed to face each other with a predetermined distance therebetween; a seal pattern, which provided between the pair of substrates and has a closed-loop shape to surround and seal a liquid crystal, wherein the liquid crystal is provided in a form of a plurality of droplets on one of the pair of substrates and then is sandwiched between the pair of substrates, so that the plurality of droplets are respectively spread and sealed in a region surrounded by the seal pattern; and a dummy pattern, which is formed on the one substrate in the region surrounded by the seal pattern and has a height less than half of the predetermined distance, the dummy pattern being arranged adjacent to and in parallel to the seal pattern and in a range to which one droplet is spread out.

According to this disclosure, when the liquid crystal display device is manufactured by one drop filling method, it is possible to spread the liquid crystal in a region surrounded by the seal pattern at a proper rate without excess or deficiency, thereby suppressing the display defects from occurring.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

First Illustrative Embodiment

Figure 1:
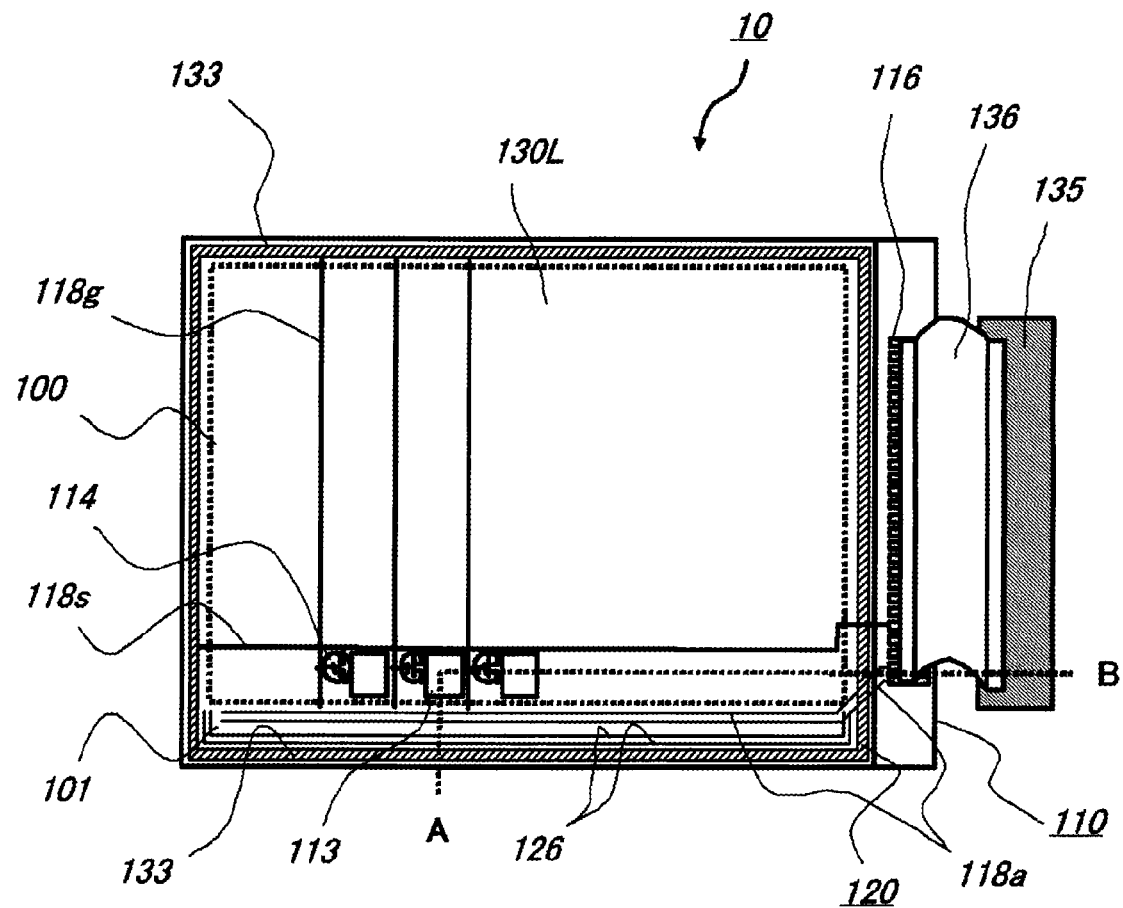
FIG. 1 is a plan view illustrating a liquid crystal display panel of a liquid crystal display device according to a first illustrative embodiment of this disclosure.
Figure 2:
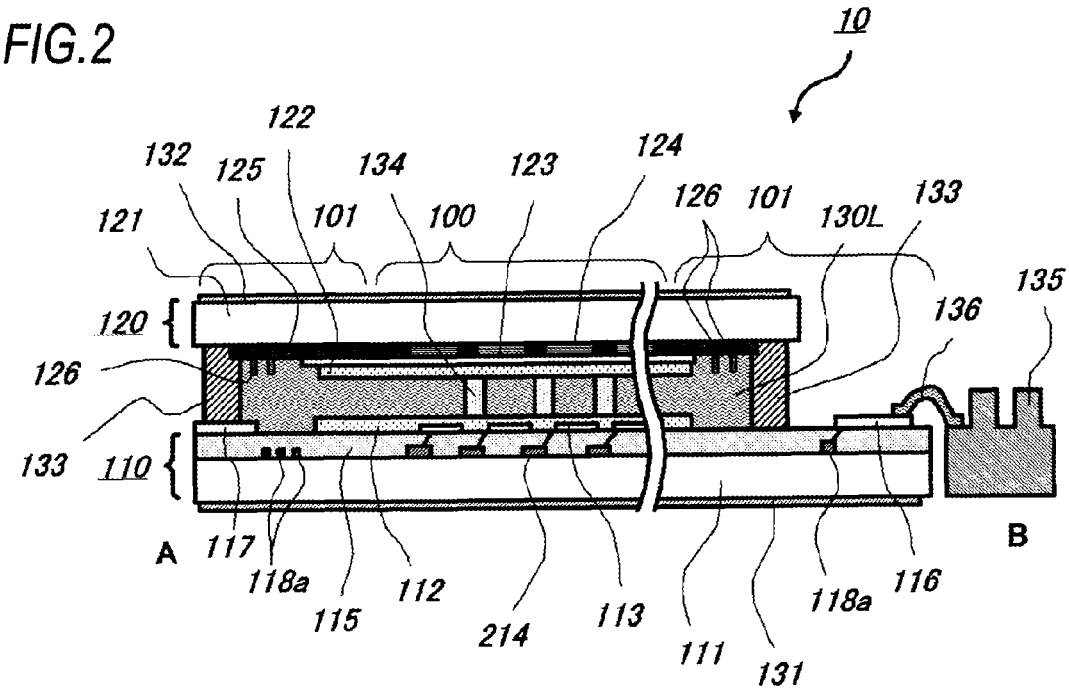
FIG. 2 is a sectional view illustrating the liquid crystal display panel of the liquid crystal display device according to the first illustrative embodiment of this disclosure.

A configuration of a liquid crystal display panel 10 configuring a liquid crystal display device according to the first illustrative embodiment will be described with reference to the schematic views of FIG. 1 and FIG. 2. FIG. 1 is a plan view illustrating the entire configuration of the liquid crystal display panel, and FIG. 2 is a sectional view taken along a line A-B in FIG. 1. Here, these figures are schematic and do not reflect the exact sizes and the like of the shown components. In addition, omission of parts other than main parts of the invention and simplification of a portion of a configuration are properly performed in order to avoid complexity of the figures. This is similarly applied to the following figures. Also, in the following figures, the same parts as those in preceding figures are indicated by the same reference numerals and a description thereof is properly omitted. Further, as an example, an operation mode of the liquid crystal as used herein is a TN (Twisted Nematic) mode. And, a case where this disclosure is applied to a liquid crystal display panel using TFT (Thin Film Transistor) as a switching element will be described.

As shown in the figures, the liquid crystal display panel 10 includes a TFT array substrate 110, in which TFTs are arranged in an array form as switching elements, a color filter substrate 120, on which a color filter or the like is formed, and a seal pattern 133. The seal pattern 133 is provided between the TFT array substrate 110 and the color filter substrate 120, and it has a closed-loop shape so as to surround at least a display region 100. Here, the display region 100 is a region corresponding to a display surface to display an image or the like when the liquid crystal display panel 10 is operated. Further, the TFT array substrate 110 and the color filter substrate 120 are adhered and bonded to each other by the seal pattern 133. Furthermore, a liquid crystal layer 130L is formed in a range including at least the display region 100 by filling and sandwiching a liquid crystal 130 in a region (in a space), which is located between the TFT array substrate 110 and the color filter substrate 120 and surrounded by the closed-loop of the seal pattern 133. In other words, the seal pattern 133 surrounds and seals the liquid crystal 130 in a region (in a space) surrounded by the closed-loop.

Although it will be separately described in detail in the description section of the manufacturing method described below, the liquid crystal display panel 10 is manufactured by an ODF (One Drop Filling) method, in which the liquid crystal 130 is arranged in a form of a plurality of droplets on a substrate surface of either one of the TFT array substrate 110 and the color filter substrate 120 which are a pair of substrates and then the plurality of droplets sandwiched between both substrates so that the liquid crystal is sealed in a region surrounded by the seal pattern 133. Accordingly, as also shown in the figures, the seal pattern 133 has structural features where the seal pattern has a closed-loop shape, and thus it is not formed with a filling opening for filling the liquid crystal used in a liquid crystal display panel manufactured by the vacuum filling method and is also not formed with a separate sealing material for sealing the filling opening.

Further, a frame region 101 is disposed so as to surround the outside of the display region 100 in a frame shape. Hereinafter, meanings of the display region 100 and the frame region 101 is applied used in the TFT array substrate 110, on the color filter substrate 120 or between both substrates of the liquid crystal display panel 10 as the same meaning.

The above-described TFT array substrate 110 includes an orientation film 112, pixel electrodes 113, TFTs 114, an insulation film 115, a plurality of gate wirings 118g and source wirings 118s, terminals 116, transfer electrodes 117 and peripheral wirings 118a and the like on one face of a transparent glass substrate 111. The orientation film 112 is intended to orient the liquid crystal 130. The pixel electrodes 113 are disposed below the orientation film 112 and apply voltage to drive the liquid crystal 130. The TFTs 114 are switching elements to supply voltage to the pixel electrode 113. The insulation film 115 is adapted to cover the TFT 114.

The plurality of gate wirings 118g and source wirings 118s are wirings to supply signals to the TFT 114. The terminals 116 receive signals to be supplied to the TFTs 114 from the outside. The transfer electrodes 117 transfer the signals inputted from the terminals 116 to opposite electrodes. The peripheral wirings 118a transfer the signals inputted from the terminals 116 to the gate wirings 118g and the source wirings 118s or the transfer electrodes 117. The TFTs 114 are provided close to each intersection of the gate wirings 118g and the source wirings 118s in the display region 100 on the TFT array substrate 110. The gate wirings 118g and the source wirings 118s are respectively provided in plural and arranged vertically and horizontally. The pixel electrodes 113 are arranged in a matrix form and formed in each pixel region surrounded by the gate wirings 118g and the source wirings 118s. Further, the terminals 116, the transfer electrodes 117 and the peripheral wirings 118a are formed in the frame region 101. In addition, the TFT array substrate includes a polarizing plate 131 on the other face of the glass substrate 111.

Meanwhile, the above-described color filter substrate 120 includes an orientation film 122, common electrodes 123, a color filter (BM) 124 and a black matrix (BM) 125 and the like on one face of a transparent glass substrate 121. The orientation film 122 is intended to orient the liquid crystal 130. The common electrodes 123 are provided below the orientation film 122, and then an electric field is generated between the common electrodes 123 and the pixel electrodes 113 on the TFT array substrate 110 to drive the liquid crystal 130. The color filer 124 is provided below the common electrodes 123. The black matrix 125 is a light-shielding layer which is provided to shield across the color filter 124 or to shield the frame region 101 disposed on the outside of the region corresponding to the display region 100. In addition, the color filter substrate includes a polarizing plate 132 on the other face of the glass substrate 121.

Further, as one of characteristic configurations of this disclosure, a dummy pattern 126 is disposed on the black matrix 125 provided in the frame region 101 of the color filter substrate 120 and is formed from the same material as the coloring material configuring the color filter 124. The dummy pattern 126 is formed to a thickness of about 1 μm, which is equivalent to a thickness of one layer of the coloring material. The dummy pattern 126 is provided along the seal pattern 133 close to the inside of the seal pattern 133. In order words, the dummy pattern 126 is provided in parallel to an extending direction of the seal pattern 133. Further, a plurality of droplets is placed when the liquid crystal 130 is sealed in a region surrounded by the seal pattern 133 using the one drop filling method at the time of manufacture and a distance between the seal pattern 133, and the dummy pattern 126 may be in a range to which one droplet of the droplets is spread out. Herein, the distance between the seal pattern 133 and the dummy pattern 126 is set to a value within the above range, specifically, set to a distance of about 0.2 mm to 0.3 mm. Although two dummy patterns 126 are formed in the present illustrative embodiment, at least one dummy pattern may be arranged or two or more dummy patterns may be arranged. The number and height of the dummy patterns 126, will be described in detail later, can be properly set so as to obtain a good balance of the rates at which the droplets of the liquid crystal 130 are spread in each direction. Further, the dummy patterns 126 may be provided in a continuous length along the seal pattern 133 or may be provided by arranging short patterns parallel to an extending direction of the seal pattern 133 in a dotted-line form or a broken-line form. In a case where the dummy patterns are provided by arranging the short patterns in the dotted-line form, any one dummy pattern 126 in multi-column dummy patterns may be arranged along an inner side of the seal pattern 133.

Further, in the first illustrative embodiment, a part of the frame region 101 provided on the inside of the seal pattern 133 is configured in such a way that the frame region 101 (hereinafter, referred to as a "wider frame region") provided on one side (−Y direction, in a lower part of the figure) is formed to be wider than the frame regions 101 provided on the other three sides. The dummy patterns 126 are arranged only in the wider frame region 101. Further, the peripheral wirings 118a are provided on the TFT array substrate 110 in the wider frame region 101. Specifically, the formation region of the peripheral wirings 118a provided in the wider frame region occupies a wider region (a larger area) than the formation region of the peripheral wirings 118a provided on the other sides. As a result, a width of the frame region 101 in this side is formed to be wider. Herein, the width of the frame region 101 and the width of the formation region of the peripheral wirings 118a in the above description refers to a width in a direction perpendicular to a direction along an end of the display region 100 or an end of the substrate, or a width in a direction perpendicular to the extending direction of the seal pattern 133.

Further, according to arranging these peripheral wirings 118a in a region surrounded by the seal pattern 133 as far as possible, it is possible to suppress the occurrence of corrosion due to moisture from the external environment, thereby improving reliability. One reason for providing the wider frame region specifically on the inside of the seal pattern 133 is that the peripheral wirings 118a are provided on the inside of the seal pattern 133.

Further, the TFT array substrate 110 and the color filter substrate 120 are disposed to face each other via the seal pattern 133 and pillar-shaped spacers 134 provided in the display region 100. In addition, the TFT array substrate 110 and the color filter substrate 120 are held in a predetermined substrate interval by the pillar-shaped spacers 134. That is, the TFT array substrate 110 and the color filter substrate 120 are spaced apart from each other by a predetermined constant distance G between the substrates. Specifically, the predetermined constant distance G between the TFT array substrate 110 and the color filter substrate 120 is equivalent to a thickness of the liquid crystal layer 130L, especially, on the pixel electrodes 113 of the display region 100. However, the predetermine constant distance G may be considered as an average value of the thickness of the liquid crystal layer 130L in the whole region surrounded by the seal pattern 133. Further, the transfer electrodes 117 and the common electrodes 123 are electrically connected to each other by the conductive particles included in the seal pattern 133, and therefore the signals inputted to the transfer electrodes from the terminal 116 are transmitted to the common electrodes 123. From the viewpoint of a stable conduction, it is preferable that the conductive particles are elastically deformable. For example, a gold-plated spherical resin may be used as the conductive particles. In addition to this, the liquid crystal display panel 10 includes a control substrate 135 to generate a drive signal, a FFC (Flexible Flat cable) 136 to electrically connect the control substrate 135 to the terminal 116, or the like.

Furthermore, a backlight unit (not shown) is arranged facing the TFT array substrate 110 on the opposite side of a display surface of the liquid crystal display panel 10 and serves as a light source. In addition, an optical sheet is disposed between the liquid crystal display panel 10 and the backlight unit and controls the polarization state or directivity or the like of light. Together with the backlight unit and the optical sheet, the liquid crystal display panel 10 is accommodated in an open housing (not shown). Specifically, an outer part of the color filter substrate 120 in the display region 100 serving as a display surface is accommodated in the open housing. In this manner, the liquid crystal display device of the first illustrative embodiment is configured.

The liquid crystal display device is operated as follows. For example, when an electric signal such as an image signal or a control signal is inputted from the control substrate 135 which is an external circuit, a drive voltage is applied to the pixel electrodes 113 and the common electrodes 123, and then orientations of the molecules of the liquid crystal 130 is changed in accordance with the drive voltage.

As a result, the light transmittance of each pixel is controlled. And, the light emitted from the backlight unit is transmitted into the TFT array substrate 110, the liquid crystal layer 130L and the color filter substrate 120 and then it is transmitted or blocked to the outside depending on the light transmittance of each pixel to the outside, so that a color image or the like is displayed on the display region 100 of the liquid crystal display panel 10.

Here, the liquid crystal display panel 10 used in this liquid crystal display device is just an example and other configurations may be employed. The operation mode of the liquid crystal display panel 10 is not limited to the TN mode but may be a STN (step Super Twisted Nematic) mode, a ferroelectric liquid crystal mode or the like. A driving method thereof may be a simple matrix method or an active matrix method, or the like. The liquid crystal display panel is not limited to a transmissive liquid crystal display panel including the pixel electrode 113 serving as a transmissive electrode, but may be a reflective liquid crystal display panel including the pixel electrode 113 serving as a reflective electrode or a semi-transmissive liquid crystal display panel including the pixel electrode 113 serving as both the reflective electrode and the transmissive electrode. Furthermore, a liquid crystal display panel using a horizontal electric field method, in which the common electrodes 123 provided in the color filter substrate 120 are provided on the TFT array substrate 110, may be employed, and then an electric field is to be applied between the common electrode 123 and the pixel electrodes 113 in a direction transverse to the substrate surface to operate the liquid crystal 130. The switching elements to supply voltage to the pixel electrodes 113 are not limited to the TFTs but may be elements such as diodes. The switching elements are omitted in the case of the simple matrix driving method.

Next, a manufacturing method of manufacturing the liquid crystal display device of the first illustrative embodiment will be described. The TFT array substrate 110 and the color filter substrate 120 may be manufactured by a general manufacturing method, and therefore the manufacturing method thereof is simply described. The TFT array substrate 110 is manufactured by forming the TFTs 114, the pixel electrodes 113, the terminal 116 and the transfer electrodes 117 on one face of the glass substrate 111 by repeatedly using a pattern forming process including a film forming process, a patterning process by a photo-lithography method and an etching process or the like. Further, the color filter substrate 120 is manufactured by forming the color filter 124, the black matrix 125, the common electrodes 123, the pillar-shaped spacers 134 and further the dummy patterns 126 on one face of the glass substrate 121 by repeatedly using the above pattern forming process. Herein, the pillar-shaped spacers 134 are formed by patterning an organic resin film and the dummy patterns 126 are formed from the same material as the color filter 124.

The dummy patterns 126 formed from the same material as the color filter 124 is a configuration that is not provided in a conventional general color filter substrate. However, since the dummy patterns 126 are made of the same material as the coloring material (color resist) configuring the color filter 124 as described above, the dummy patterns may be formed simultaneously when the coloring material (color resist) configuring the color filter 124 is formed. Furthermore, since it is sufficient to change only the design of a plane pattern, the dummy patterns can be easily formed by extension of a conventional color filter substrate manufacturing method. The simultaneous formation means that, since both are made of the same material, both are simultaneously formed into each plane pattern shape by depositing the same film material on the entire substrate and then performing a patterning process using a common exposure process or etching process. Furthermore, there is an advantage that the manufacturing cost other than the cost of design is unlikely increased. The same meaning is also applied to the following description.

Further, in order to reduce the surface irregularities on the surface of the color filter 124, to protect the surface and to suppress contamination from the coloring material, an overcoat layer made of a transparent resin film or the like may be provided. In such a case, the overcoat layer may be formed on the dummy patterns 126 formed from the same material as the color filter 124. However, since the surface irregularities formed on the surface due to the dummy patterns 126 or the height of the convex parts has effects in this disclosure, the thickness of the overcoat layer is not too thick and may be adjusted so that a certain amount of irregularity remains and a difference in level is less than half of the predetermined distance between the substrates. Further, the dummy patterns may be configured so as to partially include a pattern made of the same material as the overcoat layer by patterning the overcoat layer. Of course, the dummy patterns 126 may be formed by the pattern itself made of the same material as the overcoat layer.

Since two dummy patterns 126 are arranged in parallel and adjacent to each other in the first illustrative embodiment, it is preferred that two dummy patterns 126 are formed from the coloring material with different colors. Thereby, the two dummy patterns 126 arranged adjacent to each other are respectively formed by different patterning process of the coloring material with different colors. Accordingly, regardless of the resolution of the separation between the patterns in the patterning exposure processing for forming the coloring material, the two dummy patterns 126 can be arranged adjacent to each other with relative high accuracy, depending on the accuracy of alignment between the patterns. Of course, since the dummy patterns are configured by the coloring material with different color, the similar effects can be obtained also in a case where three or more dummy patterns 126 are formed in parallel.

Figure 3:
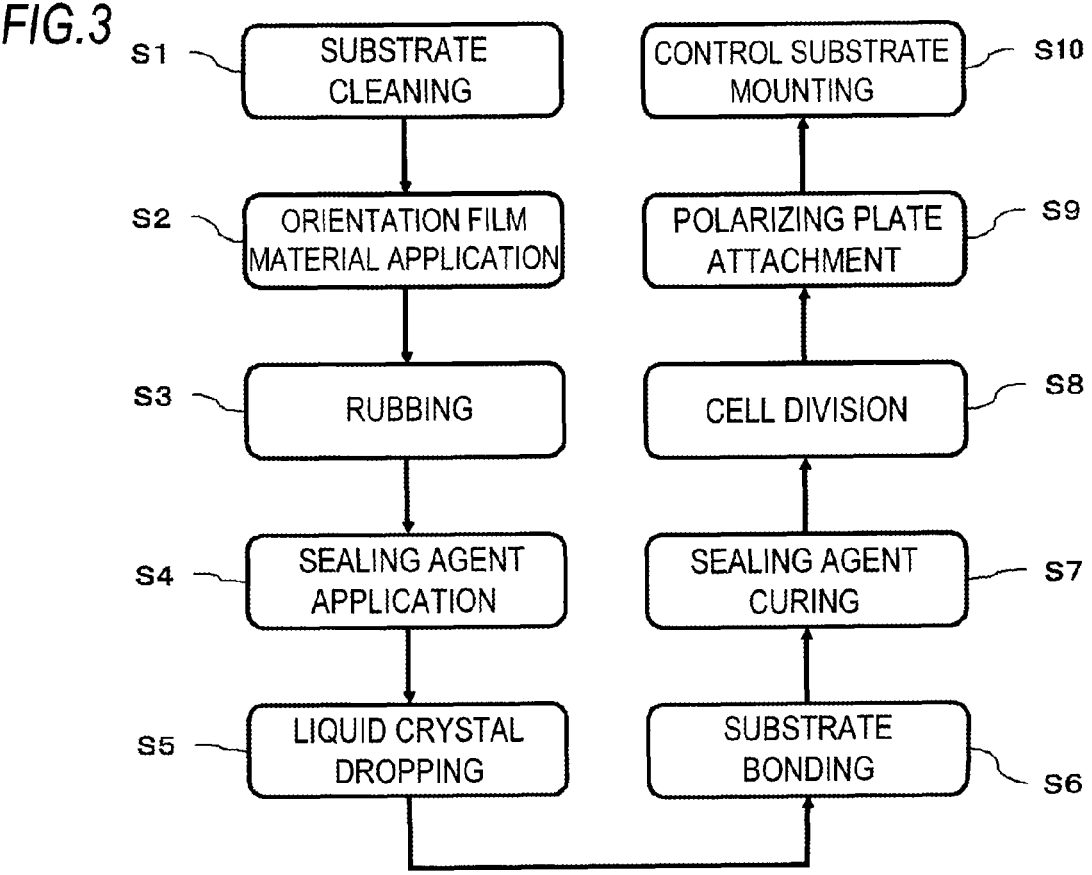
FIG. 3 is a flowchart illustrating a panel assembly process of a manufacturing process of manufacturing the liquid crystal display panel according to the first illustrative embodiment of this disclosure.

Next, a characteristic panel assembly process in the first illustrative embodiment will be described by referring to the flowchart shown FIG. 3. First, in a substrate cleaning process, the TFT array substrate 110 formed with the pixel electrodes 113 is cleaned (step S1). Next, in an orientation film material application process, an orientation film material is deposited on one face of the TFT array substrate 110 (step S2). In this process, the orientation film material made of an organic film is deposited by a printing method, for example, and is dried by being subjected to a firing process by a hot plate, etc. And then, the orientation film material is processed in a rubbing process, and the surface of the orientation film material is oriented to form the orientation film 112 (step S3). Further, similar to steps S1 to S3, the color filter substrate 120 formed with the common electrodes 123 is processed in a cleaning process, an orientation film material application process and a rubbing process to form the orientation film 122.

Next, in a sealing agent application process, as described above, a sealing agent is applied on one face of the TFT array substrate 110 or one face of the color substrate 120 using a dispenser to form the seal pattern 133 with a closed-loop shape which surrounds at least the display region 100 (step S4). As explained in the description section of the configuration, in the first illustrative embodiment, the seal pattern 133 has a function to enable conduction between the substrates, and therefore the sealing agent including the conductive particles is applied. Further, the seal pattern 133 is formed on the color filter substrate 120.

Although the pillar-shaped spacer 134 formed by patterning an organic resin film is used as a spacer to keep a predetermined distance between the substrates in the first illustrative embodiment, the spacer to keep a predetermined distance between the substrates may be formed by dispersing spherical spacers. In this case, after the process of step S4 described above, a spacer dispersion process may be performed. Even when the spacer formed by the spacer dispersion process is used, the surface irregularities of the TFT array substrate 110 or the color filter substrate 120 are different in the frame region 101 and the display region 100. Accordingly, when the distance between the substrates in the display region 100 is preferentially controlled, it is difficult to keep the proper distance between the substrates in the frame region 101 using the spacer formed by the spacer dispersion process. Accordingly, similar to the case of using the pillar-shaped spacer 134, an improvement effect by the characteristic configurations of this disclosure is effectively exhibited.

Thereafter, a liquid crystal dropping process is performed in such a way that a predetermined amount of liquid crystal 130 is dropped in a form of a plurality of droplets on the color filter substrate 120 (step S5). Subsequently, a substrate bonding process is performed in such a way that the TFT array substrate 110 and the color filter substrate 120 are bonded in a state of facing each other (step S6). In this bonding process, the color filter substrate 120 on which the seal pattern 133 having the closed-loop shape and the liquid crystal 130 in a state of droplets are placed and the TFT array substrate 110 are set in a bonding device and then evacuation is carried out, so that a bonding operation is performed under the vacuum state. At this time, the sealing agent is sandwiched between the TFT array substrate 110 and the color filter substrate 120 and squashed until a predetermined distance G between the substrates is obtained. And, each of the plurality of droplets arranged as described above is spread and the liquid crystal 130 is sealed in a space surrounded by the seal pattern 133 having the closed-loop shape, the color filter substrate 120 and the TFT array substrate 110. Meanwhile, the liquid crystal dropping process (step S5) to the substrate bonding process (step S6) are one of characteristic processes of this disclosure, and therefore it will be separately described in detail after the entire flow of the panel assembly process is briefly described.

Subsequently, in a sealing agent curing process, the seal pattern 133 is completely cured in a state where the TFT array substrate 110 and the color filter substrate 120 are bonded to each other (step S7). This process is carried out by applying heat or irradiating ultraviolet rays, depending on the material of a sealing agent to form the seal pattern 133, for example. Herein, the curing process is performed in the atmosphere by irradiating the ultraviolet ray to the seal pattern 133 which is intended to bond the TFT array substrate 110 and the color filter substrate 120. Next, in a cell division process, the bonded substrates are divided into a number of individual cells (step S8). In this process, the cells of the liquid crystal display panel formed simultaneously are divided into individual cells and a part of the color filter substrate 120 opposed to a formation part of the terminal 116 of the TFT array substrate 110 is divided and removed as scraps so that the terminal 116 is exposed.

Subsequently, the polarizing plates 131, 132 are attached to the cells in a polarizing plate attachment process (step S9) and the control substrate 135 is mounted to the cell in a control substrate mounting process (step S10), so that the liquid crystal display panel 10 is completely formed. Finally, the backlight unit is placed to face the liquid crystal display panel 10 via the optical sheet and an outer part of the color filter substrate 120 in the display region 100 serving as a display surface is accommodated in the open housing, so that the liquid crystal display device of the first illustrative embodiment is completely formed.

Figure 4:
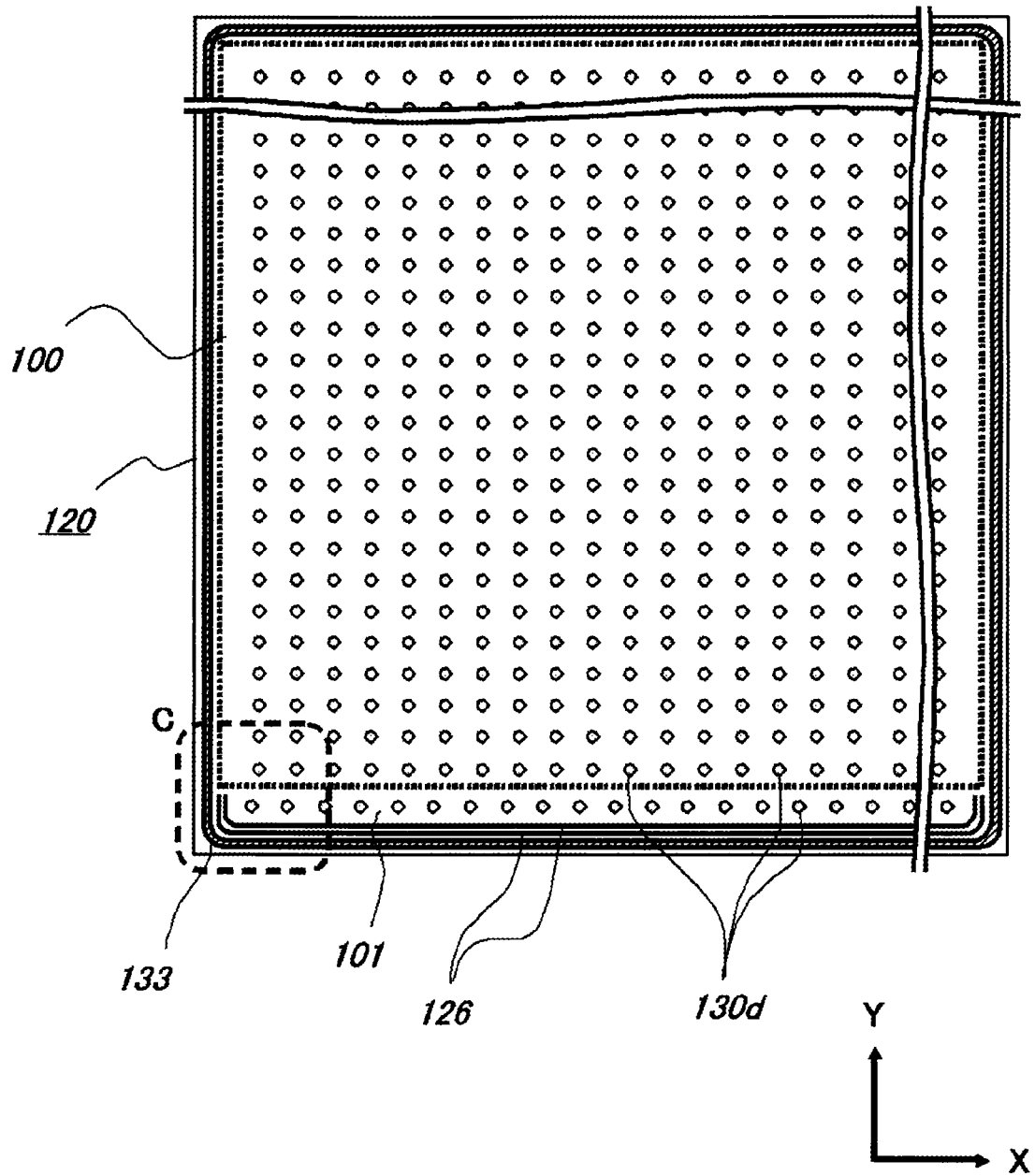
FIG. 4 is a plan view illustrating a liquid crystal dropping position in a liquid crystal dropping process of the manufacturing process of manufacturing the liquid crystal display panel according to the first illustrative embodiment of this disclosure.
Figure 5:
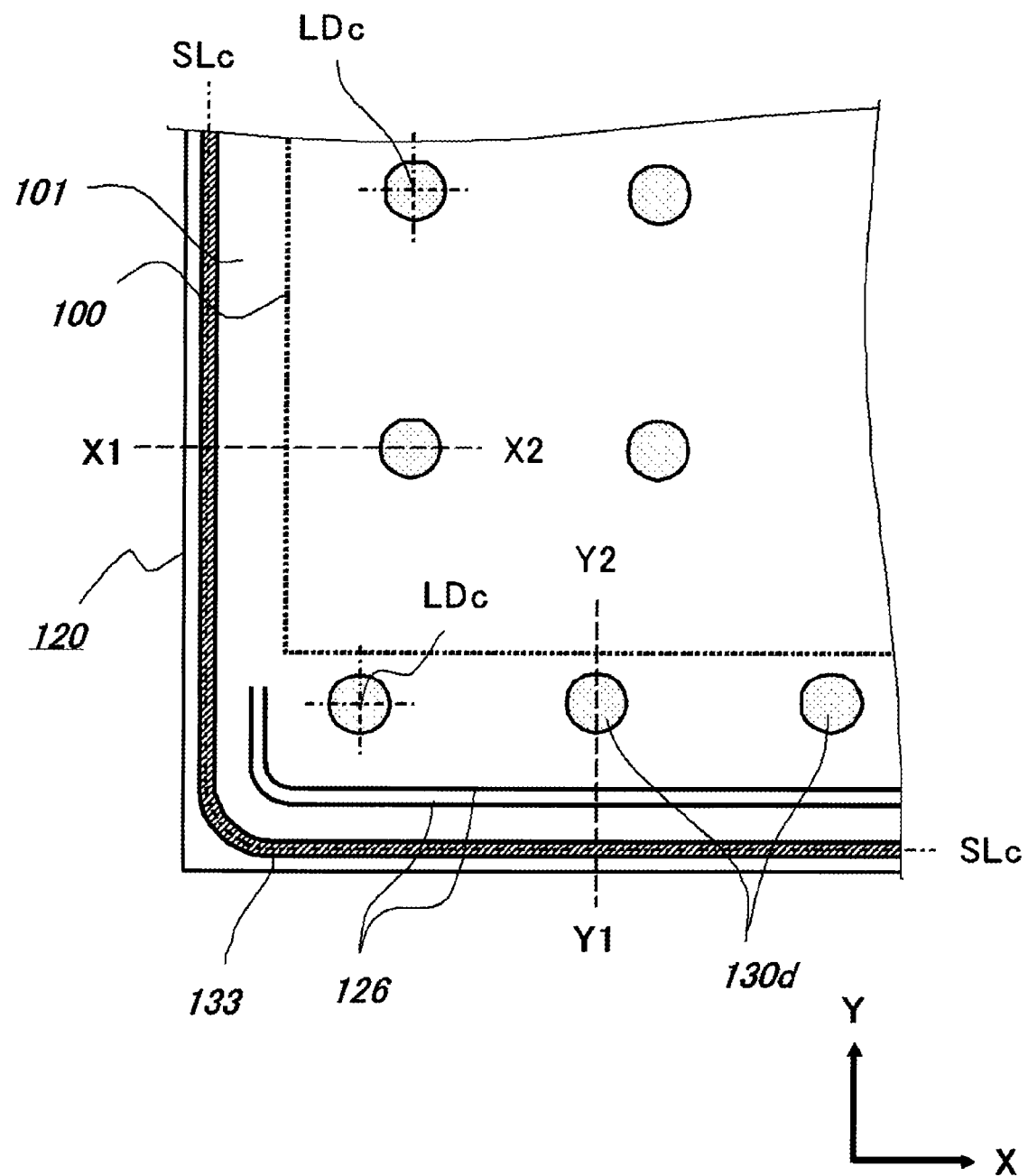
FIG. 5 is a plan view illustrating the liquid crystal dropping position in the liquid crystal dropping process of the manufacturing process of manufacturing the liquid crystal display panel according to the first illustrative embodiment of this disclosure.
Figure 6A:
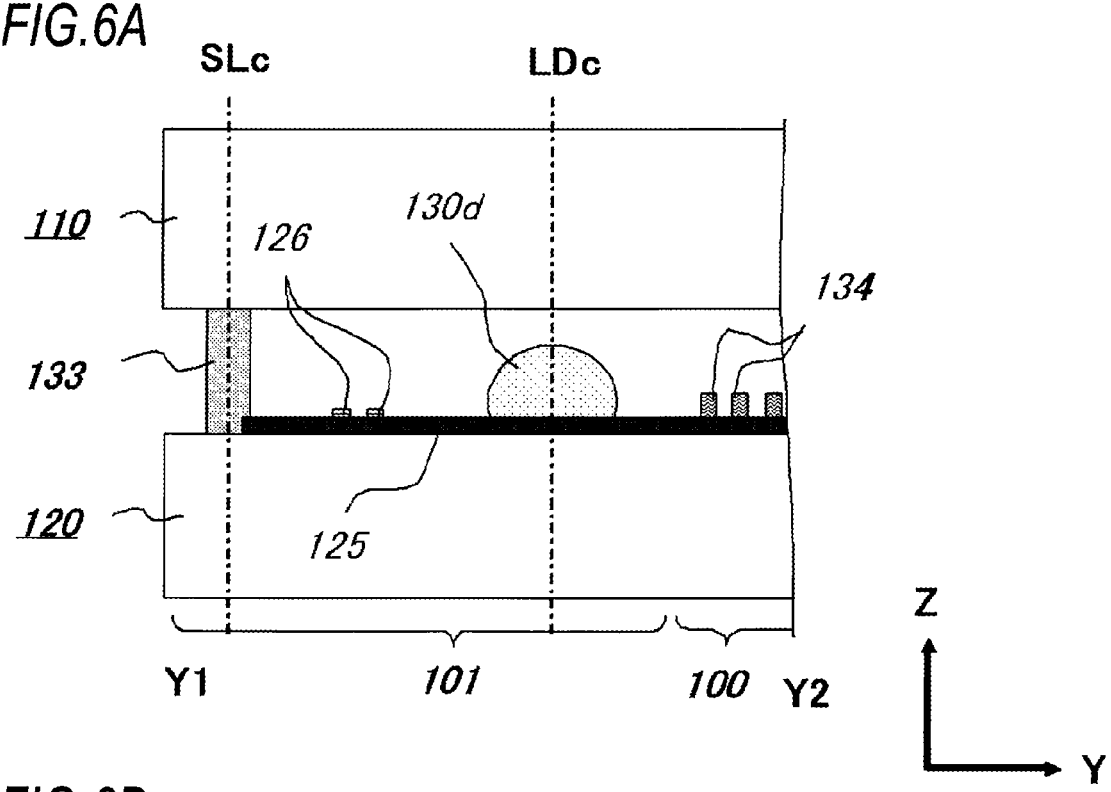
FIGS. 6A and 6B are sectional views illustrating the liquid crystal dropping position in the liquid crystal dropping process of the manufacturing process of manufacturing the liquid crystal display panel according to the first illustrative embodiment of this disclosure.
Figure 6B:
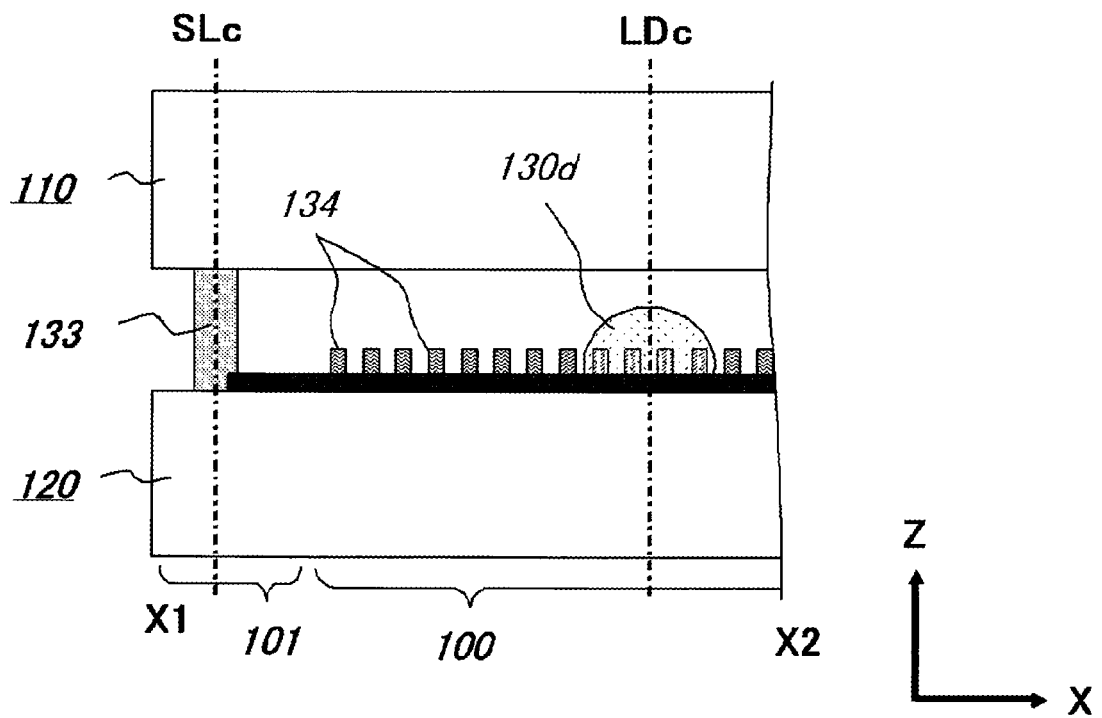

Subsequently, the liquid crystal dropping process (step S5) to the substrate bonding process (step S6), which are capable of obtaining a characteristic action and effects of the first illustrative embodiment are described in detail with reference to FIG. 4 to FIG. 6. FIG. 4 is a plan view illustrating the color filter substrate 120 which is processed in the liquid dropping process (step S5) for dropping a predetermined amount of liquid crystal 130 in a state of droplets on the color filter substrate 120. FIG. 5 is an enlarged detail plan view illustrating a region C close to one corner of the color filter substrate 120 surrounded by a broken line in FIG. 4. This corner region C corresponds to a corner part including the frame region 101 (frame region 101 located at a lower side in FIG. 4) which is wider than the frame regions 101 located at the other three sides as described above. Further, FIGS. 6A and 6B are sectional views respectively taken along a line Y1-Y2 and a line X1-X2 in FIG. 5, showing a state where the TFT array substrate 110 is arranged to face the color filter substrate 120 before the substrate bonding process (step S6).

First, after the liquid crystal dropping process (step S5), the liquid crystals 130d in a state of a plurality of droplets are dropped in an array form on a region surrounded by the seal pattern 133 which has the closed-loop shape on the color filter substrate 120, as shown in FIG. 4. A dispenser device to perform a discharging operation by a piezoelectric element can be used for dropping the liquid crystal 130. A dropping amount of one drop of liquid crystal 130d is controlled to about 1 mg to 2 mg (volume of about 1 to $2\times10^{-3}$ cc). Further, as shown in the plan views of FIG. 4 and FIG. 5 or the sectional view of FIG. 6A taken along the sectional line Y1-Y2, the dummy patterns 126 made of the same material as the coloring material configuring the color filter 124 are formed on the wider frame region 101.

The dummy patterns 126 are provided along the seal pattern 133 close to the inside of the seal pattern 133.

It is necessary that the dropping position of the liquid crystal 130d in the wider frame region 101, the distance between the dropping position and the seal pattern 133 and the formation position of the dummy patterns 126 have a particular arrangement relationship. Each droplet of the liquid crystal 130d to be dropped is indicated by a solid line, and a central position LDc of the dropping position is indicated by a dashed line (intersection) in FIG. 5. In a case where a symbol p refers to a volume of one droplet, a symbol G refers to a predetermined distance between the substrates and symbol W refers to a final width of the seal pattern 133, a distance D, which is to be a reference distance (unit there of is centimeter, for example), between the dropping position of the liquid crystal and the seal pattern 133 (considering a center SLc of the seal pattern width as a reference) can be set to a following relationship:

$$D = \frac{1}{2} \times \sqrt{(p/G)} + W/2.$$

That is, the dropping position of the liquid crystal 130d in the frame region 101 can be set to a position separated from the center position SLc of the seal pattern 133 by a distance equal to or slightly greater than the distance D. Alternatively, since an upper limit of the distance of the liquid crystal from the seal pattern 133 is determined when the liquid crystal is dropped into the frame region 101, the liquid crystal may be dropped at a position in the frame region 101 which is separated from the center position SLc of the seal pattern 133 by at least the distance D.

The liquid crystal is spread into a substantially rectangular shape having sides parallel or perpendicular to the extending direction of the seal pattern 133 when the liquid crystal 130d dropped, especially, in the vicinity of the seal pattern 133 is spread between the TFT array substrate 110 and the color filter substrate 120. When the bonding of the TFT array substrate 110 and the color filter substrate 120 is finally completed and then the predetermined distance G between the substrates is obtained, it is assumed that one drop of the liquid crystal 130d occupies the range of the rectangular pillar having a height which is equal to the predetermined distance G between the substrates. When the shape occupied by one droplet of the liquid crystal 130d spreading into the rectangular shape from the dropping position is a rectangular column having a height which is equal to the predetermined distance G between the substrates, symbol p (volume of one droplet) corresponds to $(2a)^2 \times G$ where a length of one side is indicated by 2a (here, a distance from a center (specifically, a center of gravity) of the rectangular shape to one side thereof is indicated by the symbol a). Accordingly, it can be expected that distance a (unit: cm)=$\frac{1}{2} \times \sqrt{(p/G)}$. Here, the distance a may be considered as a spreading amount in a direction perpendicular to the side of the rectangular shape, especially, when the liquid crystal is spread into a rectangular shape from the center position LDc of the droplet, or as a spreading amount in a direction toward the seal pattern 133.

Further, when the bonding of the TFT array substrate 110 and the color filter substrate 120 is completed and then the predetermined distance G between the substrates is obtained, it is preferred that the liquid crystal 130d is accurately filled to close to the end of the seal pattern 133. Accordingly, the distance between the end of the seal pattern and the center position LDc of the droplet may be set to a value which is equal to or slightly greater than the distance a. Further, since the end of the seal pattern corresponds to a distance of W/2 with respect to the center SLc of seal pattern width, the reference distance D between a preferable dropping position of the liquid crystal and the seal pattern 133 (considering the center SLc of the seal pattern width as a reference) corresponds to a+W/2, and the formula of D=$\frac{1}{2} \times \sqrt{(p/G)}$+W/2 is obtained.

In this case, based on the amount (volume of about 1 to $2 \times 10^{-3}$ cc) of droplets to be discharged by the dispenser device according to the general piezoelectric element method and the predetermined distance (about 4 μm) between the substrates used in the liquid crystal of TN mode, it can be estimated based on the above formula that the reference distance D between a preferable dropping position of the liquid crystal and the seal pattern 133 (considering the center SLc of the seal pattern width as a reference) becomes about 1 cm. In order to estimate specific value, the volume p of one droplet may use the general value as a reference or an average value of the amounts of one droplet to be discharged by the dispenser device being used. In this case, the volume of one droplet can be easily calculated by dropping a predetermined number of droplets sufficient to average the variations on the substrate, and measuring the difference in weight of the substrate before and after dropping and dividing the measured weight value by the number of dropped droplets.

Further, since the width W of the seal pattern 133 is up to about 1 mm, and then the distance between the center SLc of the seal pattern width and the end of the seal pattern 133 corresponds to W/2, this distance becomes about 0.5 mm. Accordingly, this distance is much smaller than the distance D which is equal to about 1 cm. Therefore, there is no big effect even when the distance between a center position LDc of the dropping droplets and the end of the seal pattern 133 is approximately used as the distance D. Accordingly, the dropping position of the liquid crystals 130d in the frame region 101 is located at positions separated from the end of the seal pattern 133 by about 1 cm.

Further, a distance (corresponding to the distance between the center positions LDc of the droplets adjacent to each other) between respective droplets arranged in the extending direction of the seal pattern 133 may be approximately twice the spreading distance from the center position LDc of the droplets, that is, the length 2a of one side of the rectangular shape when being spread into the rectangular shape. Meanwhile, the distance D substantially corresponds to the spreading distance a from the center position LDc of the droplets, that is, also corresponds to the range to which one droplet is spread out. Accordingly, respective droplets are dropped and formed at intervals of about 2 cm, which is twice the distance D.

Furthermore, the dummy patterns 126 has been already formed during the formation of the color filter substrate 120, the spreading rate and shape of the droplet dropped most close to the dummy pattern can be adjusted when the dummy patterns are provided at least between the seal pattern 133 and the center position LDc of the droplets dropped most close to the dummy pattern or between the dropping position of the droplet dropped most close to the dummy pattern and the seal pattern 133. Accordingly, as a design of a plane pattern, the distance between the seal pattern 133 and the dummy patterns 126 may be in a range to which one droplet is spread out. In order words, the dummy patterns 126 may be arranged in a region between the formation position of the seal pattern 133 and a position separated from the seal pattern 133 by a spreading distance from the center position LDc of the droplets, that is, a distance a=$\frac{1}{2} \times \sqrt{(p/G)}$. For example, in the first illustrative embodiment, the dummy patterns 126 are formed corresponding to the dropping position of the liquid crystals 130d described above and also in a range of less than 1 cm from the end of the seal pattern 133. Specifically, a plurality of dummy patterns 126 are formed at a position spaced from the end of the seal pattern 133 by an uniform distance selected from a range of about 0.2 mm to 0.3 mm and extend in the same direction as the extending direction of the seal pattern 133, that is, in a direction parallel to the extending direction of the seal pattern.

Meanwhile, for the frame regions 101 (hereinafter, referred to as a "narrower frame region") other than the wider frame region 101, the display region 100 and the seal pattern 133 are disposed relatively close to each other, and therefore it is not necessary to set the dummy patterns 126 or to set the dropping position of the liquid crystal with accuracy, as described above. As shown in the plan view of FIG. 5 and the X1-X2 sectional view of FIG. 6B taken across the frame region 101 in which the display region 100 and the seal pattern 133 are disposed relatively close to each other, the dummy patterns 126 are not provided in this narrower frame region 101, and also it is not necessary to drop the droplets of the liquid crystal on the narrower frame region 101. Accordingly, the droplets of the liquid crystal may be dropped in the display region 100 while being relatively separated from the seal pattern 133. Specifically, when dropping the liquid crystal 120 onto these frame regions 101 and the display region 100, it is not necessary to set the dropping position with high accuracy, different from the wider frame region 101. Further, as a total amount of respective droplets dropped on the color filter substrate 120, the dropping amount of the liquid crystal 130 can be carefully set and managed in consideration of the volume of a liquid crystal filling region which can be estimated from the desired distance G between the substrates and the region surrounded by the seal pattern 133.

Figure 7:
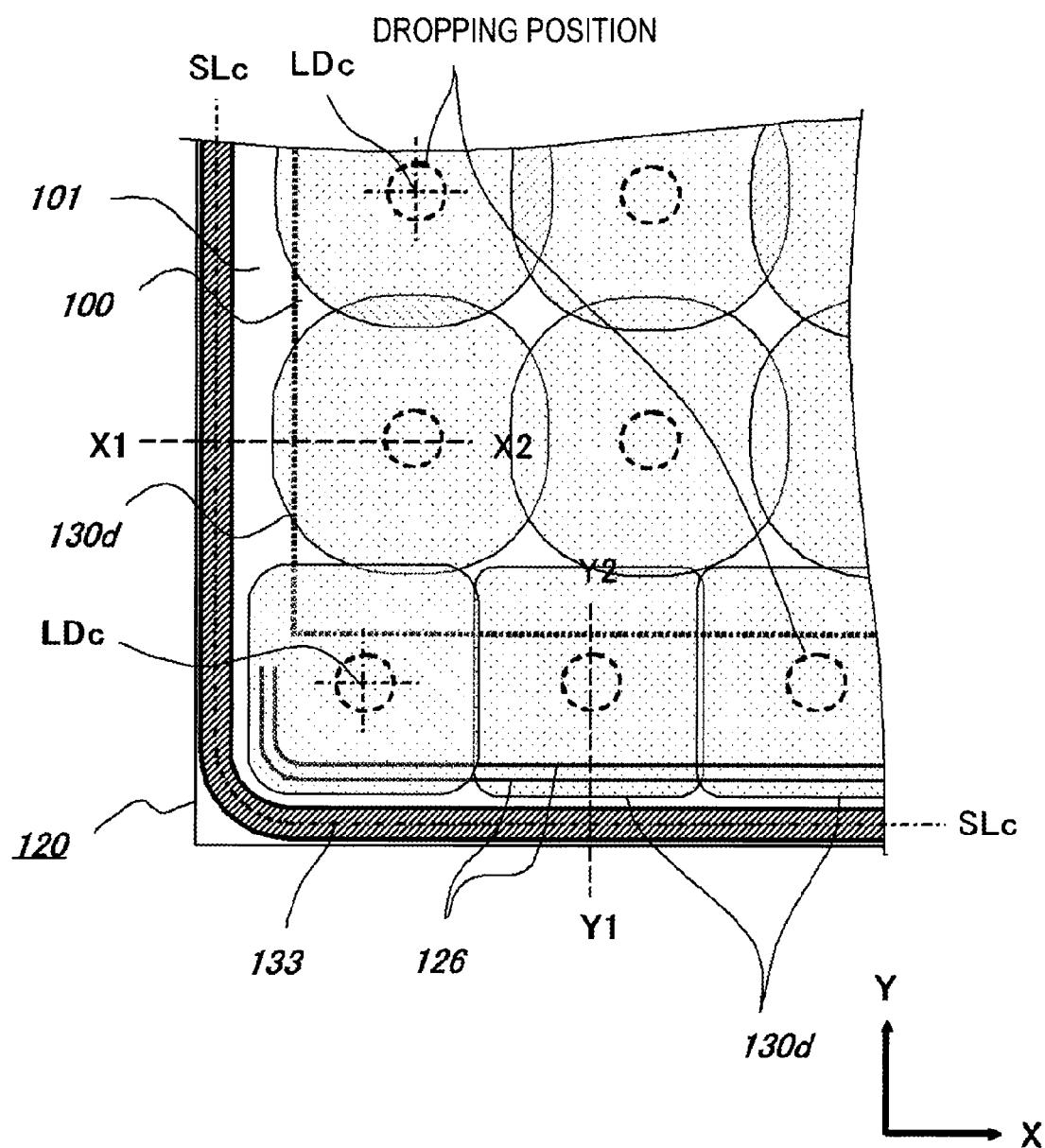
FIG. 7 is a plan view illustrating a spreading state of a liquid crystal in a substrate bonding process of the manufacturing process of manufacturing the liquid crystal display panel according to the first illustrative embodiment of this disclosure.
Figure 8A:
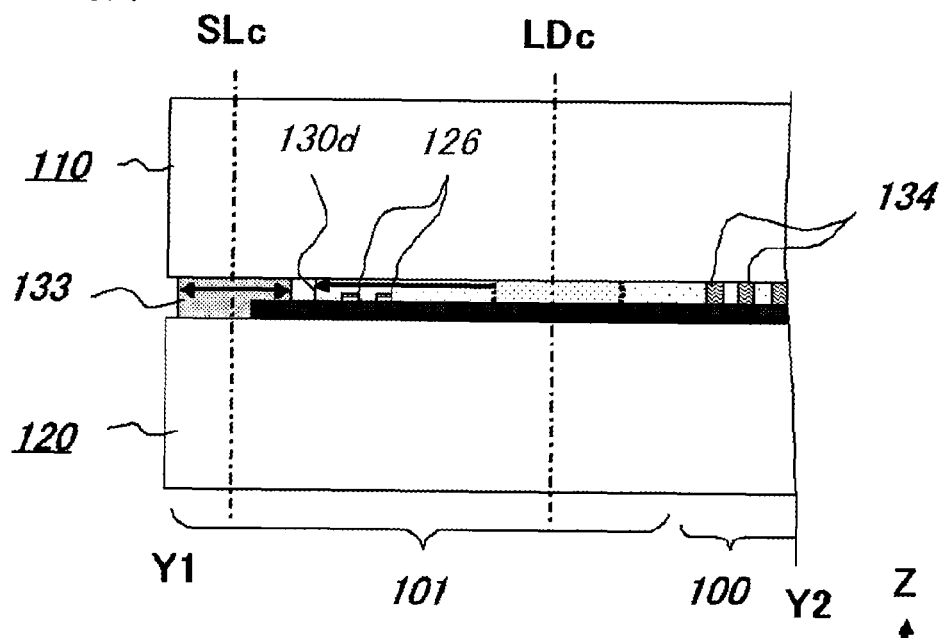
FIGS. 8A and 8B are sectional views illustrating the spreading state of the liquid crystal in the substrate bonding process of the manufacturing process of manufacturing the liquid crystal display panel according to the first illustrative embodiment of this disclosure.
Figure 8B:
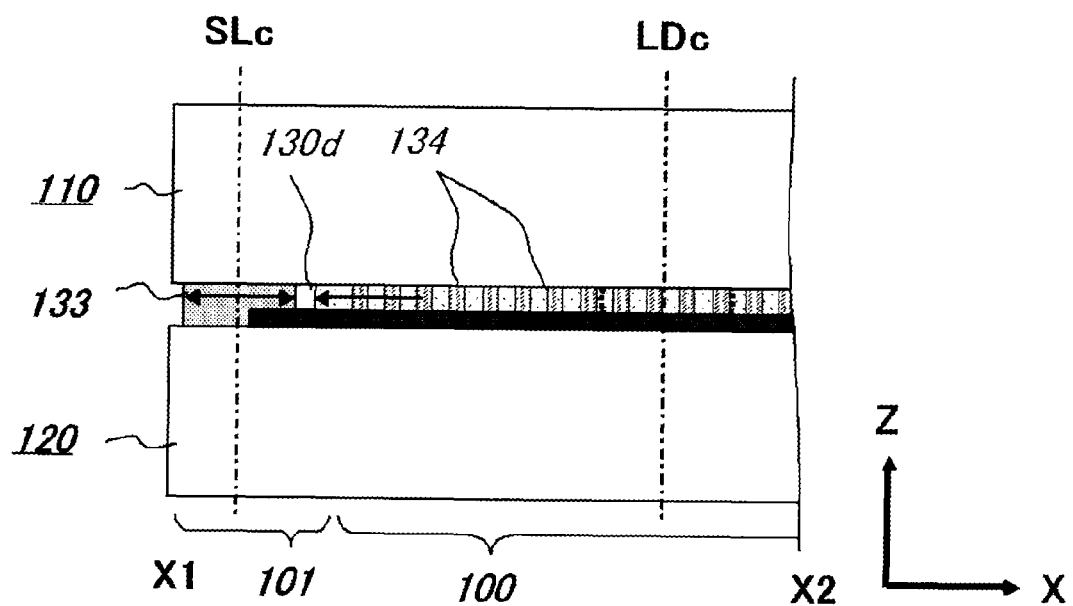

Subsequently, in the substrate bonding process (step S6), the TFT array substrate 110 and the color filter substrate 120 are approached to each other, and the seal pattern 133 is sandwiched and spread between the TFT array substrate 110 and the color filter substrate 120. Similarly, respective droplets of the liquid crystal 130 are sandwiched between the TFT array substrate 110 and the color filter substrate 120 and subsequently spread in the liquid crystal filling region. Hereinafter, a spreading behavior or the like of the liquid crystal 130d and the seal pattern 133 dropped in the substrate bonding process (step S6) will be described in detail with reference to FIG. 7 and FIG. 8. Here, FIG. 7 show a state shortly before the substrate bonding process (step S6) is completed, in the same position as FIG. 5 described above. Meanwhile, FIGS. 8A and 8B are sectional views respectively taken along a line Y1-Y2 and a line X1-X2 in FIG. 7, showing a state in the same time as FIG. 7 and in the same position as FIG. 6.

In FIG. 7, the position of respective droplets of the liquid crystal 130d in the droplet state when dropped is indicated by a broken line (the center position LDc of the droplets is indicated by a dashed line, as in FIG. 5) and the spreading region of the respective droplets of the liquid crystal 130d in the droplet state is indicated by a substantially circular shape or a rectangular shape with rounded corners. In the figures, overlapping regions are present between spreading regions of respective droplets. Actually, in the overlapping regions between the spreading regions of the liquid crystal shown in the figure, the droplets of both spreading regions are interfered with each other, and thus the overlapped volume fraction of the liquid crystal is spread to the surroundings. Further, since respective droplets are spread while being complicatedly interfered with the dummy patterns 126, the orientation film 122 formed on the display region 100 and the other level in difference, actually, the droplets do not spread in such a simple shape. Accordingly, it is noted that FIG. 7 is a conceptual view for explaining the brief spreading state of respective droplets.

First, as shown in FIG. 7, when the droplet dropped on the display region 100 is isotropically spread to the surroundings, the droplet is not interfered, especially, an anisotropic interference action by the surface irregularity or the like of the color filter substrate 120 with which the droplet is brought into contact. Accordingly, the droplet is isotropically spread, that is, spread into a circular shape until the droplet is interfered with an adjacent droplet. On the other hand, for the droplet dropped on the frame region 101, a spreading region of the liquid crystal in a direction toward the seal pattern 133 is formed into a substantially rectangular shape due to the presence of the dummy patterns 126 provided in parallel to the seal pattern 133. Further, a spreading region of the liquid crystal in a opposite direction toward the display region 100 is similarly formed into a substantially rectangular shape by the difference in level of the orientation film 122 formed on the surface of the color filter substrate 120 in the display region 100.

Meanwhile, in a case where the height of the dummy patterns 126 is extremely high relative to the surface irregularities of the color filter substrate 120 such as difference in level of the orientation film 122 beyond which the droplet goes when spreading in a direction toward the display region 100, the spreading rate of the liquid crystal in a direction toward the seal pattern 133 becomes too slow due to the dummy patterns 126. That is, when the liquid crystal is first caught in difference in level formed by the dummy patterns 126, the liquid crystal is spread only in a direction toward the display region 100 before going beyond the difference in level of the dummy patterns 126. In such a case, consequently, the droplet is not spread into the rectangular shape (square shape) as shown in FIG. 7, and therefore this is not preferable. That is, it is necessary to properly balance the spreading rates of the dropped droplet in each direction. Further, a proper reference height of the dummy patterns 126 may be equal to difference in level formed on the color filter substrate 120, such as difference in level of the orientation film 122. Since these differences in level are normally not higher than half of the predetermined distance between the substrates, the height of the dummy patterns 126 is set to be less than at least half of the predetermined distance between the substrates. Further, when the height of the dummy patterns 126 is lower than the difference in level formed on the color filter substrate 120, the balance of the spreading rates may be adjusted by arranging a plurality of dummy patterns 126 as in the first illustrative embodiment.

Here, pillar-shaped spacers may be also arranged on the frame region 101 and may have the same height as the pillar-shaped spacers 134 provided on the display region 100. Since the surface irregularity of the frame region 101 is different from that of the display region 100, these pillar-shaped spacers are formed in heights slightly different from the pillar-shaped spacers 134. Specifically, the pillar-shaped spacers arranged on the frame region have a height substantially equal to the predetermined distance between the substrates, that is, a height much greater than half of the predetermined distance between the substrates. However, since the pillar-shaped spacers are formed in the pillar-shaped shape having a diameter of about several μm and dispersedly arranged, the pillar-shaped spacers do not serve as a dam to suppress the spread of the liquid crystal. Accordingly, in the foregoing description, the pillar-shaped spacers have been excluded from the object to form the difference in level which affects the spreading rate of the liquid crystal.

Further, a longitudinal direction of the dummy patterns 126 is perpendicular to a direction toward the seal pattern 133 or a direction toward the display region 100 as described above and there is no significant surface irregularity or difference in level to restrict the spread of the liquid crystal in the longitudinal direction of the dummy patterns. Accordingly, the spread of the liquid crystal in the longitudinal direction of the dummy patterns is slightly faster than the spread of the liquid crystal in the direction toward the seal pattern 133 or the direction toward the display region 100. In addition, it is thought that the shape of the spread becomes a curved shape in a middle stage of spreading when the liquid crystal is spread in the longitudinal direction of the dummy patterns 126. However, as described above, the distance between respective droplets arranged in the extending direction of the seal pattern 133 is set in consideration of the volume of the liquid crystal when spreading into the rectangular shape. In the end, the spreading region of respective droplets is finally restricted in a substantially rectangle-shaped region due to interference between adjacent droplets. As a result, the droplets dropped on the frame region 101 are restricted in the substantially rectangular (square) region, as shown in FIG. 7. That is, the assumption is close to being correct that one droplet of the liquid crystal 130d occupies the range of the rectangular column having a final height which is equal to the predetermined distance G between the substrates when the bonding of the TFT array substrate 110 and the color filter substrate 120 is completed and the predetermined distance G between the substrates is obtained.

Further, the distance between the dropping position and the seal pattern 133 as previously set is set on the basis of the spreading region of one droplet of the liquid crystal which is estimated from the assumption that the droplets are spread in an isotropic square shape around the dropping position when the droplets are spread between the substrates in the substrate bonding process. That is, since the distance between the dropping position and the seal pattern 133 is set at a position equivalent to a rectangular spreading region estimated from the volume of each droplet or at a position slightly spaced apart from the seal pattern 133 with respect to the rectangular spreading region, the droplets dropped on the frame region 101 are placed in the region surrounded by the seal pattern 133 substantially without excess or deficiency. As a result, it is unlikely that the liquid crystal 130 is excessively leaked to the outside of the seal pattern 133 or the liquid crystal 130 is contaminated due to the contact of the liquid crystal 130 and an uncured seal pattern 133 for a long time.

Further, FIG. 8A shows a sectional view (a sectional view taken along a line Y1-Y2) of the wider frame region 101. As in apparent from the sectional view, in the wider frame region 101, the distance between the substrates is not kept to a predetermined value and it is difficult to obtain a proper distance between the substrates, different from the display region 100 on which the pillar-shaped spacers 134 are formed. That is, the distance between the substrates is susceptible to variations. As described above, the pillar-shaped spacers may be arranged on the frame region 101. However, since the surface irregularity of the frame region 101 is different from that of the display region 100, the pillar-shaped spacers arranged on the frame region 101 are formed at heights which are different from the predetermined distance between the substrates. Accordingly, it is still difficult to obtain a proper distance between the substrates. Although the frame region 101 in which the distance between the substrates is susceptible to variations is relatively wide, the liquid crystal 130d dropped on the frame region 101 continuously applies a repulsive force to the TFT array substrate 110 during the substrate bonding process (step S6), as shown in FIG. 8A. Accordingly, it is possible to suppress an excessive pressure from being applied to the seal pattern 133 between the TFT array substrate 110 and the color filter substrate 120.

Specifically, since the height of the dummy patterns 126 is set to an appropriate height, the liquid crystal 130d is spread out in the vicinity of the seal pattern 133 as proceeding of the bonding of the TFT array substrate 110 and the color filter substrate 120. Accordingly, when the distance between the TFT array substrate 110 and the color filter substrate 120 is approximated to the predetermined distance G between the substrates, regions close to the seal pattern 133 are filled with the liquid crystal 130d to the extent, and thus the repulsive force by the liquid crystal 130d can be exerted on a region very close to the seal pattern 133. As a result, it is possible to avoid a situation that the seal pattern 133 or the conductive particles in the seal pattern 133 are too squashed and the display defects where the peripheral gap becomes non-uniform are caused.

Further, when the liquid crystal 130d is merely dropped on a region close to the seal pattern 133 in the wider frame region 101, the droplet are excessively spread. For this reason, there is a situation that the liquid crystal 130 is leaked to the outside of the seal pattern 133 or the liquid crystal 130 is contaminated due to the contact of the liquid crystal 130 and an uncured seal pattern 133 for a long time. However, since the arrangement of the dummy patterns 126, the dropping position of the liquid crystal and the positional relationship between the dummy patterns 126 and the seal pattern 133 or the like are appropriately selected as described above, the droplets do not excessively spread and thus the above situations do not occur.

Further, for the frame regions 101 other than the wider frame region 101, the display region 100 and the seal pattern 133 are disposed relatively close to each other, and therefore it is not necessary to set the dummy patterns 126 as described above or to set the dropping position of the liquid crystal with accuracy. Further, as is apparent from the sectional view (sectional view taken along a line X1-X2) of FIG. 8B, for these narrower frame regions 101 and the part of the display region 100 close to the narrower frame regions 101, the pillar-shaped spacers 134 placed in the display region 100 are disposed considerably close to the formation part of, especially, the seal pattern 133 in the frame region 101, and therefore a distance approximated to the proper distance between the substrates is steadily kept also in the formation part of the seal pattern 133. Accordingly, even when the spread of the liquid crystal is slightly delayed and bubble regions are formed, it is unlikely that the seal pattern 133 or the conductive particles in the seal pattern 133 are too squashed. Further, finally, a liquid crystal is gradually and uniformly spread in the regions surrounded by the seal pattern 133, and therefore the bubble regions are filled with the liquid crystal. Accordingly, the gap unevenness between the substrates to cause the display defects does not occur.

As described above, in the liquid crystal display device of the first illustrative embodiment and the liquid crystal display panel 10 configuring the liquid crystal display device, the dummy patterns 126 are arranged adjacent to the seal pattern along the extending direction of the seal pattern 133, that is, in parallel to the extending direction, in the color filter substrate 120. Accordingly, it is possible to adjust the spreading rate and shape of the droplets to be dropped on the color filter substrate 120. Further, the dummy patterns 126 are provided in a region between the seal pattern 133 of the frame region 101 and the display region 100, and it arranged adjacent to the seal pattern 133, specifically in a range to which one droplet is spread out. Accordingly, it is possible to properly adjust the spreading rate and shape of the droplets, even when the liquid crystal 130d is dropped in the vicinity of the sea pattern 133. Further, since the arrangement or height of the dummy patterns 126, the dropping position of the liquid crystal and the positional relationship between the dummy patterns 126 and the seal pattern 133 or the like are appropriately selected, it is possible to spread the liquid crystal in a region surrounded by the seal pattern without excess or deficiency.

As a result, even when the liquid crystal 130d is dropped in the vicinity of the seal pattern 133, it is unlikely that the droplet are excessively spread and the liquid crystal 130 is leaked to the outside of the seal pattern 133 or the liquid crystal 130 is contaminated due to the contact of the liquid crystal 130 and an uncured seal pattern 133 for a long time. Further, since the liquid crystal 130d can be dropped in the vicinity of the seal pattern 133 without causing the above-described situations or the liquid crystal 130d is spread out in the vicinity of the seal pattern 133 as the bonding of the TFT array substrate 110 and the color filter substrate 120 is progressed, a substantially uniform repulsive force by the liquid crystal 130d dropped on the frame region 101 can be exerted on the TFT array substrate 110 including a region very close to the seal pattern 133 during the substrate bonding process. Accordingly, it is possible to avoid a situation that the seal pattern 133 or the like is too squashed and thus the peripheral gap becomes non-uniform. As a result, it is possible to suppress occurrence of the display defects due to both the unevenness of the peripheral gap and the contamination of the liquid crystal 130.

Since the dummy patterns 126 are formed from the same material as the coloring material configuring the color filter 124 and formed simultaneously with the color filter in the above-described first illustrative embodiment, the above-described effects can be obtained without increasing the specific process and also without affecting the productivity. Further, the dummy patterns 126 may be formed from the same material as the orientation film 122 or the common electrodes 123 and formed simultaneously therewith, and then the same effects can be obtained. When the liquid crystal 130d is dropped on the TFT array substrate 110, the dummy patterns 126 may be formed from the same material as any pattern to be formed on the TFT array substrate 110 other than the dummy patterns 126 and formed simultaneously therewith, and also the same effects can be obtained.

Specifically, in order to suppress the spreading rate of the liquid crystal 130d from being too slow, it is preferable that the height of the dummy patterns 126 is set to be less than half of the predetermined distance G between the substrates. Accordingly, when the dummy patterns are formed form the coloring material, the dummy patterns can be suitably formed to a thickness of one layer of the coloring material and the materials described above may be properly used. On the other hand, it is not preferable that, when the dummy patterns are formed by laminating a plurality of layers of coloring materials, the height of the dummy patterns 126 may exceed the above-described preferred range. Similarly, it is not preferable that the dummy patterns are formed from the same material as the pillar-shaped spacers 134 having a height corresponding to the distance (thickness) between the substrates since the height of the dummy patterns 126 becomes excessively high. However, in a case where resin is formed to have different heights (thickness) by varying the exposure amount depending on the regions using a half-tone exposure technique (or a gray-tone exposure technique) or the like, the dummy patterns 126 may be formed from the same material as the pillar-shaped spacers 134 and thus obtain a height less than about half of the height of the pillar-shaped spacers 134. When the dummy patterns are formed in such a low height, there is no difficulty in applying the dummy patterns 126 formed from the same material as the pillar-shaped spacers 134, and thus the same effects can be achieved. Further, even when the dummy patterns are formed by laminating a plurality of layers of coloring materials, if the dummy patterns 120 having a height within the above-described preferred range can be formed by using a relatively thin coloring material or the like, there is no difficulty in applying the dummy patterns.

In the first illustrative embodiment, the dummy patterns 126 are formed only on the wider frame region 101. Specifically, when the width of the frame region 101 is narrow and the seal pattern 133 and the formation regions of the pillar-shaped spacers 134 in the display region 100 are arranged close to each other, it is not necessary to use the droplets of the liquid crystal 130d in the vicinity of the seal pattern 133 and also it is not necessary to form the dummy patterns 126. Further, a specifically narrower frame region 101 lacks a region to form the dummy patterns 126. In this case, widening the frame region 101 in order to form the dummy patterns 126 is a mistake to lead upside down. Accordingly, in a case where the widths of the frame region 101 are different, it is preferable that the dummy patterns are specifically provided only on the side wider than the other sides, as in the first illustrative embodiment. Further, in a case where the wider frame region 101 is formed on two or more sides, the formation number or the like of the dummy patterns 126 may be appropriately adjusted depending on the width of each frame region 101 corresponding to the formation region of the dummy patterns 126. In addition, a schematic reference width of the frame region 101 effective to form the dummy patterns 126 is determined by the volume of one droplet of the liquid crystal 130d to be dropped. When the frame region 101 having a width greater than about 1 cm is formed, it is effective as in the first illustrative embodiment that the dummy patterns 126 are formed and the liquid crystal 130d is dropped between the dummy patterns 126 and the display region 100,.

Further, in a case where wider frame regions are formed on not a particular side but partial regions in a variant panel or the like, dummy patterns such as the dummy pattern 126 may be formed adjacent to and along the seal pattern 133 in the wider frame regions, regardless of the shape of the seal pattern. In other words, the dummy patterns 126 may be formed in parallel to an extending direction of the seal pattern. More specifically, the dummy patterns may be formed at a substantially constant distance from the target seal pattern, which is arranged close to the dummy pattern, in vertical direction. As described above, in the variant panel or the like, the same effects as the first illustrative embodiment can be achieved by forming the dummy patterns such as the dummy patterns 126 along the shape of the seal pattern on the wider frame region, in order words, forming the dummy patterns in parallel to the extending direction of the seal pattern and in the vicinity of the seal pattern and also dropping the droplets of the liquid crystal at a position of the frame region which is located close to the seal pattern and spaced apart from the seal pattern by the same distance as the first illustrative embodiment. Further, as in the case where the frame region 101 on a particular side is formed to be wider, it is sufficient to form the dummy patterns only on the wider frame region, and it is not necessary to arrange the dummy patterns on unnecessary parts. From the viewpoint of the narrower frame and the space saving of the display device, it is preferable that the dummy patterns are provided only on the wider frame region.

In the first illustrative embodiment, the TN mode is used as an example. Accordingly, the predetermined distance G between the substrates is set to about 4 μm, and the spreading region of the droplets are also set on the basis of the predetermined distance G between the substrates. In a case where another mode, in which an optimal distance between the substrates is different from the TN mode, is applied to the liquid crystal display device, an appropriate proximity range or dropping position of the dummy patterns 126 may be suitably selected in consideration of the distance between the substrates to be set. For example, in a liquid crystal display panel using a horizontal electric field method, an optimal distance G between the substrates is typically about 3 μm and therefore the spreading region of the droplets becomes small.

Figure 9:
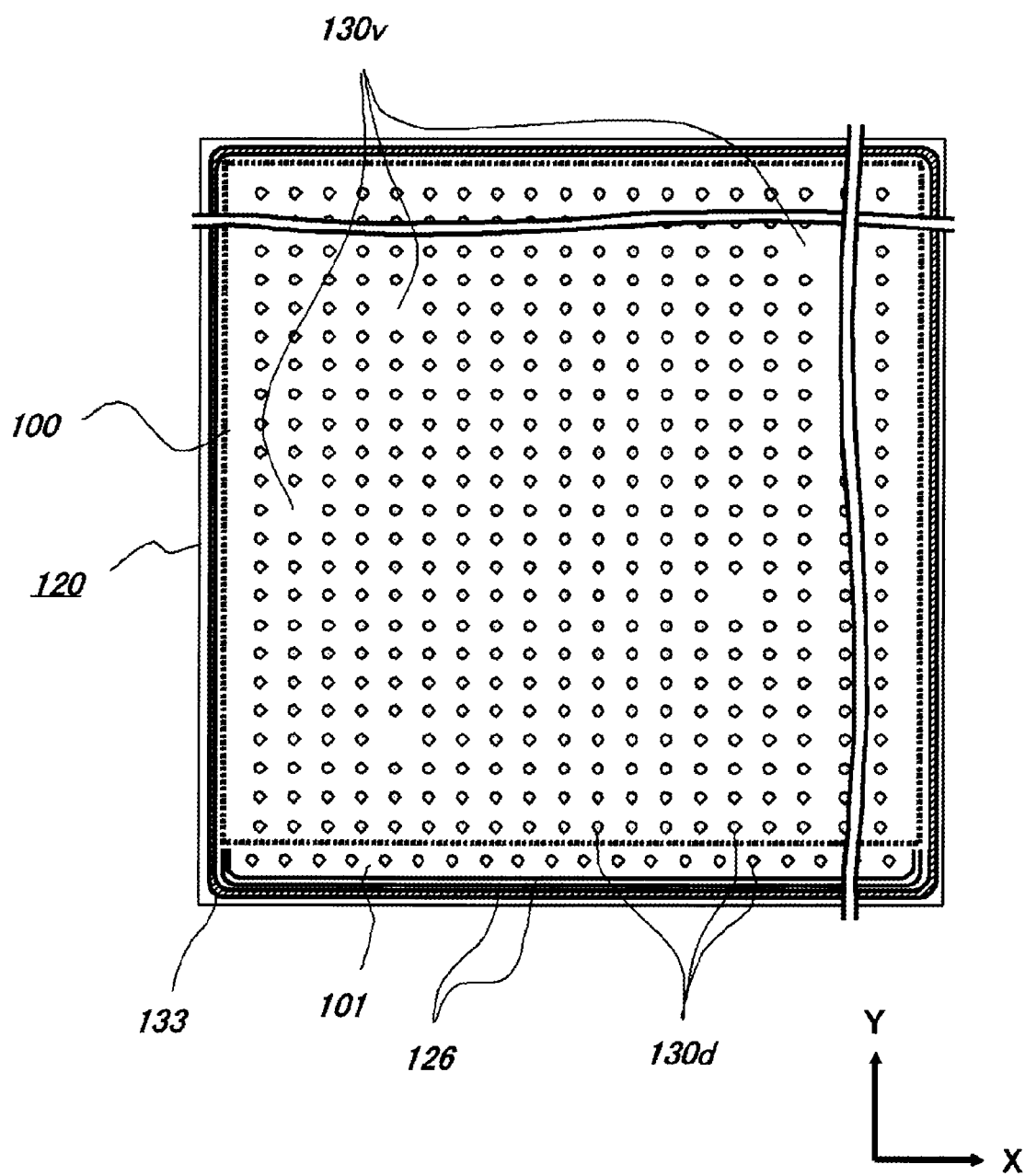
FIG. 9 is a plan view illustrating a liquid crystal dropping position in a manufacturing process of manufacturing a liquid crystal display panel according to a modification of the first illustrative embodiment of this disclosure.

Further, in the first illustrative embodiment, except for the droplets of the liquid crystal 130d dropped on the frame region 101 close to the seal pattern 133, the droplets are uniformly dropped on the display region 100, as shown in FIG. 4. However, as shown in FIG. 9, droplet blank portions 130ν with no droplet may be formed in some places with respect to the droplets which are substantially uniformly arranged. The droplet blank portions 130ν may be formed periodically or at random. However, it has no meanings to form respective droplet blank portions 130ν very close to each other. Preferably, the droplet blank portions 130ν are properly distributed in the dropping region. Basically, it is more preferable that the droplet blank portions 130ν are formed in the dropping region with substantially uniform density.

As described above, actions and effects achieved by forming the droplet blank portions 130ν with respect to the droplets, which are substantially uniformly arranged, will be described below. In the first illustrative embodiment of this disclosure, the droplets are arranged close to the seal pattern 133 and the time when the liquid crystal 130 is completely filled into all the regions surrounded by the seal pattern 133 and the time when the liquid crystal 130 is completely filled in the vicinity of the seal pattern 133 are set to be corresponded to each other. However, except for such a special setting, it is general that the liquid crystal 130 is filled in the regions surrounded by the seal pattern 133 in such a way that the droplets are mainly arranged and dropped only on the display region 100 which is slightly separated from the seal pattern 133. As a result, the regions between respective droplets are filled with the liquid crystal in the display region 100 on which the droplets are mainly arranged and dropped, and after that the liquid crystal is filled in the vicinity of the seal pattern 133. That is, the liquid crystal 130 is filled in the vicinity of the seal pattern 133 at the end. As a result, as described above, the cell close to the seal pattern or the seal pattern itself is too squashed, and thus the display defects where the peripheral gap becomes non-uniform are caused. According to forming the droplet blank portions 130ν with respect to the droplets arranged, it is possible to delay the time when the regions between respective droplets are filled with the liquid crystal in the regions on which the liquid crystal is dropped. In this way, the time when the regions between respective droplets are filled with the liquid crystal and the time when the liquid crystal 130 is filled in the vicinity of the seal pattern 133 can be corresponded to each other or approximated to each other. Consequently, it is possible to finely disperse the bubble regions in the plane and it is possible to suppress large bubbles from being locally formed in the vicinity of the seal pattern 133 or the like. That is, it is possible to avoid a situation that the cell close to the seal pattern 133 or the seal pattern itself is too squashed and then the peripheral gap becomes non-uniform causing the display defects.

When the above configuration is applied to the first illustrative embodiment, the spread of the droplets other than the droplets arranged close to the seal pattern 133 is directed not only to the peripheral side of the panel, that is, from the center portion of the panel to the seal pattern 133, also to an isotropic direction around the dropping position at respective dropping positions of the droplets. Accordingly, there is an effect to improve the precision of an action (aim of the first illustrative embodiment) to corresponds the time when the liquid crystal 130 is completely filled into all the regions surrounded by the seal pattern 133 with the time when the liquid crystal 130 is completely filled in the vicinity of the seal pattern 133.

Herein, a uniform arrangement degree of the droplet of the liquid crystal 130d used in the description of the case of forming the droplet blank portions 130ν will be described as below. Specifically, it may be applied that an arrangement of the dropping positions are arranged at an equal pitch in the XY direction shown in FIG. 4, for example. Alternatively, in a case of a nozzle of the dispenser device discharges the droplets while being moved, the nozzle is moved at a constant speed with performing the discharging operation in the constant period, and in a case of the nozzle discharges the droplets while being stopped, the feeding pitch of the nozzle can be a predetermined constant value in each of the XY direction, for example. That is, above positional variations during the dropping process will be the acceptable degree. In such degree, it is possible to achieve the same effect as the effect obtained by forming the droplet blank portions 130ν with respect to the droplets which are substantially uniformly arranged.

Meanwhile, this disclosure is not limited to the configurations of the first illustrative embodiment and a modification thereof or other configurations implying modification and but may be appropriately modified to a known configuration in a range without departing from the spirit of this disclosure. Further, each configuration of the first illustrative embodiment described above and a modification thereof or other configurations implying modification can be properly combined in a range without causing the contradiction and each effect resulting from each configuration and a combined effect thereof can be achieved.

What is claimed is:

1. A liquid crystal display device comprising:
a pair of substrates disposed to face each other with a predetermined distance therebetween;
a seal pattern, which is provided between the pair of substrates and has a closed-loop shape to surround and seal a liquid crystal, wherein the liquid crystal is provided in a form of a plurality of droplets on one of the pair of substrates and then is sandwiched between the pair of substrates, so that the plurality of droplets are respectively spread and sealed in a region surrounded by the seal pattern; and
a dummy pattern, which is formed on the one of the pair of substrates in the region surrounded by the seal pattern, the dummy pattern being arranged adjacent to and in parallel to the seal pattern, and a distance between the dummy pattern and the seal pattern is in a range to which one droplet is spread out;
wherein the dummy pattern is arranged in a region between a formation position of the seal pattern and a position spaced apart from the seal pattern by a distance represented by following formula:

$$D = \tfrac{1}{2} \times \sqrt{(p/G)}$$

wherein D refers to a distance from the seal pattern, and
wherein p refers to a volume of one droplet, and
wherein G refers to the predetermined distance between the pair of substrates.

2. The liquid crystal display device according to claim 1, wherein the one of the pair of substrates is a color filter substrate including a color filter, and wherein the dummy pattern is formed from the same material as one of coloring materials configuring the color filter formed on the color filter substrate.

3. The liquid crystal display device according to claim 2, wherein a plurality of the dummy pattern is formed, and wherein each of the plurality of the dummy patterns is formed from different coloring materials.

4. The liquid crystal display device according to claim 1, wherein the one of the pair of substrates is an array substrate, on which the switching elements are arranged in an array form, and wherein the dummy pattern is formed from the same material as one of the seal pattern or the dummy pattern formed on the array substrate.

5. The liquid crystal display device according to claim 1,
wherein the liquid crystal display device includes a display region and a frame-shaped frame region which is provided outside the display region, and the display region and the frame region are formed on each of the pair of substrates, and
wherein, when the frame region has a wider frame region, which is partially formed to have a wide width, inside of the seal pattern, the dummy pattern is formed in the wider frame region of the frame region.

6. The liquid crystal display device according to claim 5, wherein the one of the pair of substrates is a rectangular array substrate on which switching elements are arranged in an array form, and the wider frame region of the frame region is a frame region located at one side of the rectangular array substrate, wherein a formation region of a peripheral wiring formed on the array substrate in the wider frame region of the frame region, which is located at one side of the rectangular array substrate, is widely formed as compared to other regions of the frame region, which is located at other sides of the rectangular array substrate, and wherein the peripheral wiring formed on the wider frame region located at the one side of the rectangular array substrate is formed in a region inside the seal pattern.

7. A method of manufacturing the liquid crystal display device according to claim 1, wherein the liquid crystal display device includes a display region and a frame-shaped frame region which is provided outside the display region, and the display region and the frame region is formed on each of the pair of substrates, the method comprising:
arranging, when the plurality of droplets is disposed on the one of the pair of substrates, the droplets to at least a region inside of the seal pattern of the frame region.

8. The method of manufacturing the liquid crystal display device according to claim 7, the method further comprising:
arranging the droplets to the region inside of the seal pattern of the frame region to be spaced apart from a center position of the seal pattern at least by a distance represented following formula;

$$D = \tfrac{1}{2} \times \sqrt{(p/G)} + W/2,$$

wherein D is a distance from the center position of the seal pattern
wherein p refers to a volume of one droplet,
wherein G refers to the predetermined distance between the pair of substrates, and
wherein W refers to a width of the seal pattern.

9. A method of manufacturing the liquid crystal display device according to claim 1, wherein the liquid crystal display device includes a display region and a frame-shaped frame region which is provided outside the display region, and the display region and the frame region are formed on each of the pair of substrates, the method comprising:
arranging, when the plurality of droplets is disposed on the one of the pair of substrates, the plurality of droplets to disposing positions to form droplet blank portions, in which the droplet are not arranged, with respect to a uniformly-arranged droplets, in which the droplets are uniformly arranged on the display region.

* * * * *